United States Patent
Yamada

(10) Patent No.: US 6,202,951 B1
(45) Date of Patent: Mar. 20, 2001

(54) TAPE CARTRIDGE

(75) Inventor: Satsuki Yamada, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/325,154

(22) Filed: Jun. 3, 1999

(30) Foreign Application Priority Data

Jun. 5, 1998 (JP) .................................................. 10-157378

(51) Int. Cl.[7] .................................................. G11B 23/087
(52) U.S. Cl. ........................................ 242/342; 242/611.2
(58) Field of Search ..................................... 242/340, 342, 242/349, 611.2; 360/132; 74/415, 457, 460, 462

(56) References Cited

U.S. PATENT DOCUMENTS

| | | | |
|---|---|---|---|
| 4,515,331 | * | 5/1985 | Stumpfi et al. .................... 242/611.2 |
| 4,541,587 | | 9/1985 | Stumpfi et al. . |
| 4,679,109 | * | 7/1987 | Okamura et al. ..................... 242/342 |
| 4,715,558 | * | 12/1987 | Fair et al. ............................. 242/342 |

FOREIGN PATENT DOCUMENTS

| | | |
|---|---|---|
| 661 609 | 7/1987 | (CH) . |
| 0 051 145 | 5/1982 | (EP) . |
| 60-051685 | 4/1985 | (JP) . |
| 62-080280 | 5/1987 | (JP) . |

* cited by examiner

*Primary Examiner*—Katherine A. Matecki
(74) *Attorney, Agent, or Firm*—Frommer Lawrence & Haug, LLP.; William S. Frommer; Matthew K. Ryan

(57) ABSTRACT

Ribs serving as reinforcing members of the hub pawls provided to the inner peripheral surface of a cylindrical hub around which a tape is wound can be formed in a simple shape using an electric discharge electrode. A hub comprises plural hub pawls projected from the inner peripheral surface of a hub hole of a tape winding hub, and ribs each of which has a slant surface and is provided to the base portions at both the sides in the hub rotational direction of the hub pawl, wherein the slant surface of the rib is formed in a convex three-dimensional shape (arcuate shape) which is inclined with respect to the cylindrical hub pawl.

3 Claims, 6 Drawing Sheets

TAPE CARTRIDGE

BACKGROUND OF THE INVENTION

1. Field of the Invention

The present invention relates to a tape cartridge, and more particularly to an enforcing rib provided to a hub pawl of a tape winding hub.

2. Description of the Related Art

As shown in FIG. 1, a tape cartridge in a prior art is constructed so that plastic (generally, high-impact polystyrene) hubs 12 around which a tape 11 is wound are freely rotatably located on respective driving shaft insertion holes 13 at the right and left sides in a main body case 10. Each of both the ends of the tape 11 is hooked and coupled to a part of each outer periphery of the right and left hubs 12 by a cramping piece 14, and the tape 11 is drawn from one hub 12 to the front face of the main body case 10 and wound by the other hub 12.

The hub 12 has a hub hole 15 at the center thereof, and a plurality of hub pawls 16 are integrally projected from the inner peripheral surface of the hub hole 15 in the central direction so as to be spaced from one another at predetermined intervals.

The hub pawl 16 is designed in a substantially cylindrical shape of about 1.5 mm in diameter and about 1 mm in length, and it is extremely smaller as compared with the size, thickness, etc. of the overall hub 12. Therefore, fast feeding or rewinding operation by a recent tape recorder imposes a large impact load on the hub pawls 16, and excessive stress is applied to the bases of the hub pawl 16, so that such a problem as damage or the like may occur. Particularly since there frequently occurs such a case that a user carries a tape cartridge on the road when the user goes outdoors, when a drop impact or the like is applied to a tape cartridge while the tape cartridge is accommodated in an accommodation case, a hub rotation stop member at the accommodation case side and the hub pawls 16 collide against each other, and the hub pawls 16 may be damaged at the base portions thereof.

JP-A-60-51685U previously proposed a device of a countermeasure of preventing the damage of the hub pawls 16 as described above. In this device, as shown in FIG. 2, the base portion of the hub pawl 16 in the rotational direction is provided with ribs 18 each comprising a rounded R-surface 17. By forming the R-surface 17 as described above, the concentration of the excessive stress due to the impact load which is applied to the hub pawls 16 in the rotational direction can be avoided, and the strength can be enhanced, so that the damage preventing effect of the hub pawls 16 can be expected.

However, in case of the hub pawl 16 having the ribs 18 having the R-surface 17 as described above, when the hub 12 is manufactured, it is necessary to process the place of a die corresponding to the R-surface portion of the hub pawl in a minute and complicated three-dimensional shape, and it is difficult or impossible to perform the processing by using equipment such as an electric discharge machine or the like. Therefore, there is a problem that the cutting work must be manually carried out on the place.

In order to solve this problem, there is known JP-A-62-80280U. In this device, as shown in FIGS. 3 and 4, the rib 19 provided to the base of the hub pawl 16 is designed in a simple two-dimensional shape to have an R-surface 20. That is, as shown in FIG. 4, the rib 19 has the R-surface 20 provided in the rotational direction of the hub 12, and side surfaces 22 which are crossed to the R-surface 20 through the ridgelines at both the sides of the R-surface 20, and the R-surface 20 is designed to have the same curvature in the pawl peripheral direction W. The rib 19 of the hub pawl 16 is designed in such a two-dimensional simple shape as described above, so that the electric discharge machining to form a die can be performed and the die processing can be facilitated.

However, even when the R-surface of the rib provided to the hub pawl in the prior art described above is designed in a simple two-dimensional shape, the shape of an electrode required for the electric discharge machining to form a die must be processed in conformity with the shape of the rib. Therefore, there is a problem that the shape of the electrode is complicated.

Accordingly, there is a problem that a rib must be designed in such a shape that an electrode for the electric discharge machining used to process a die for the rib provided to the hub pawl is simple.

SUMMARY OF THE INVENTION

In order to solve the above problem, a tape cartridge according to the present invention in which a hub for winding a tape therearound is accommodated, is characterized in that the hub comprises a hub hole penetrating through the center position, a plurality of cylindrical hub pawls projected from the inner peripheral surface of the hub hole, and ribs having slant surfaces which are provided to the base portions of the plural hub pawls in the hub rotational direction, the slant surfaces of the ribs are designed in a three-dimensional convex shape which is swollen from the cylindrical hub pawls, and further the ribs having the three-dimensional swollen convex shape are designed in an arcuate shape which is inclined with respect to the cylindrical hub pawls.

Further, each of the arcuate ribs inclined with respect to the cylindrical hub pawls has a slant angle of 30 degrees to 70 degrees, and the rib height dimension which comprises the cross point between the slant surface and the hub pawl, and the tangential line of the hub hole is set to 0.37 mm to 0.47 mm.

By adopting the above structure, the processing becomes possible merely by designing an electrode used when the electric discharge machining of a die is performed into a simple shape such as a cylindrical shape, a semi-cylindrical shape or the like, so that the power saving when forming the electrode for the electric discharge machining can be achieved and also the cost can be reduced.

DESCRIPTION OF THE PREFERRED EMBODIMENT

Figure 1:
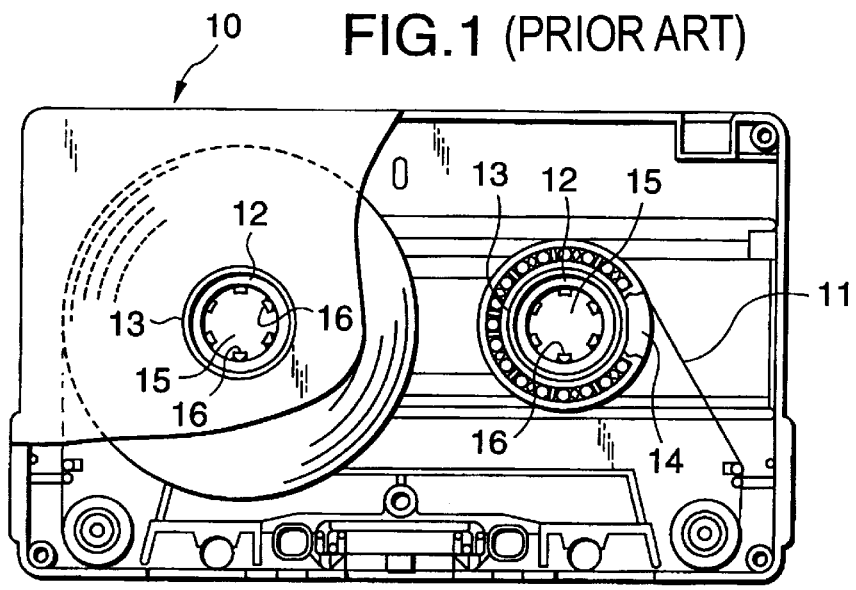
FIG. 1 is a plan view showing a hub of a prior art which is mounted on a tape cartridge.
Figure 2:
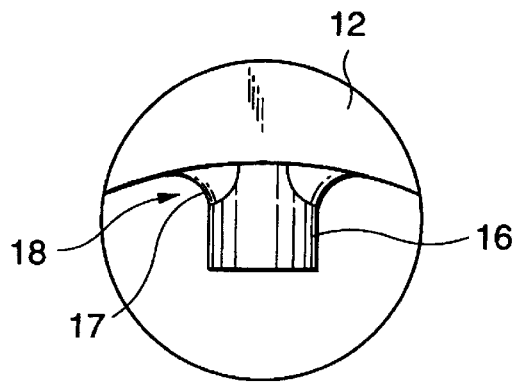
FIG. 2 is an explanatory view showing a state where ribs are provided to hub pawls as is shown in JP-A-60-51685U.
Figure 3:
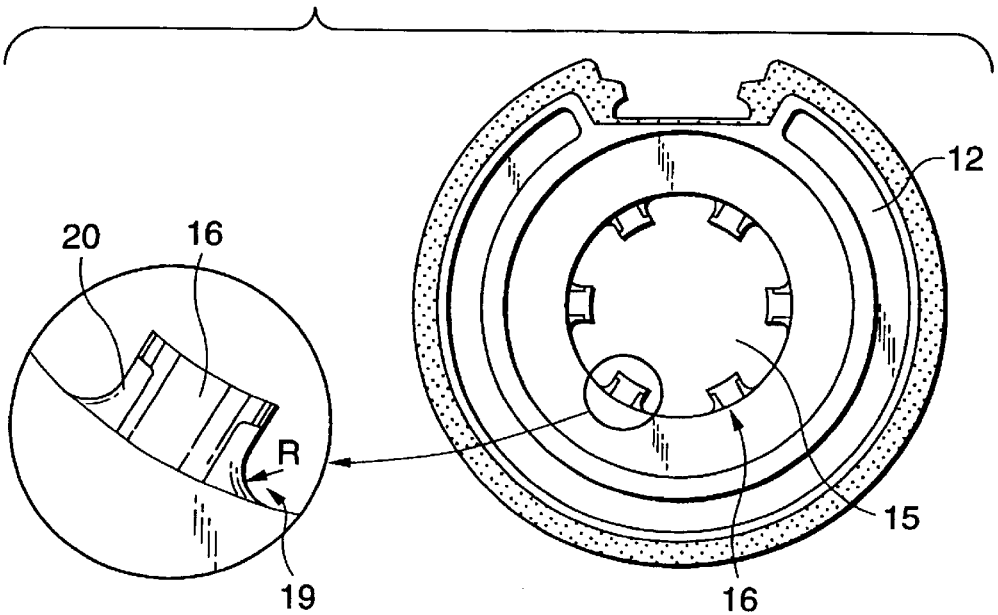
FIG. 3. is a plan view showing a state where ribs are provided to hub pawls as shown in JP-A-62-80180U.
Figure 4:
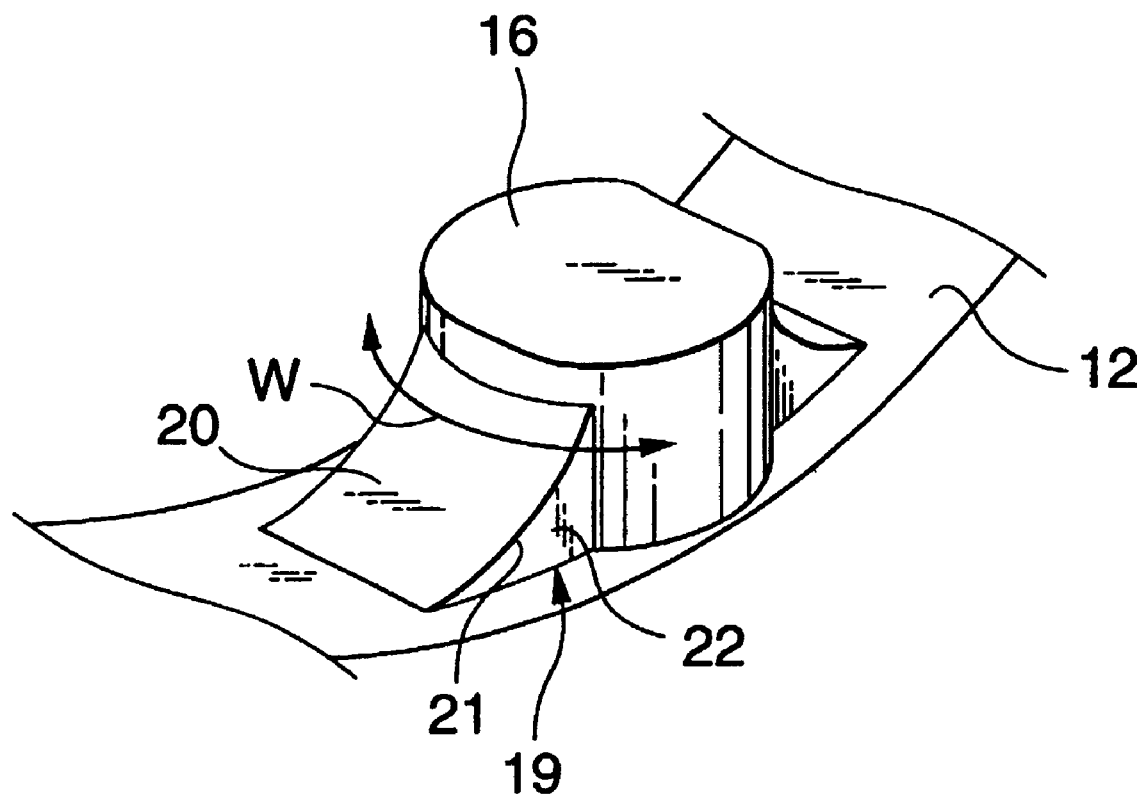
FIG. 4 is a perspective view showing ribs provided to hub pawls in FIG. 3.
Figure 5:
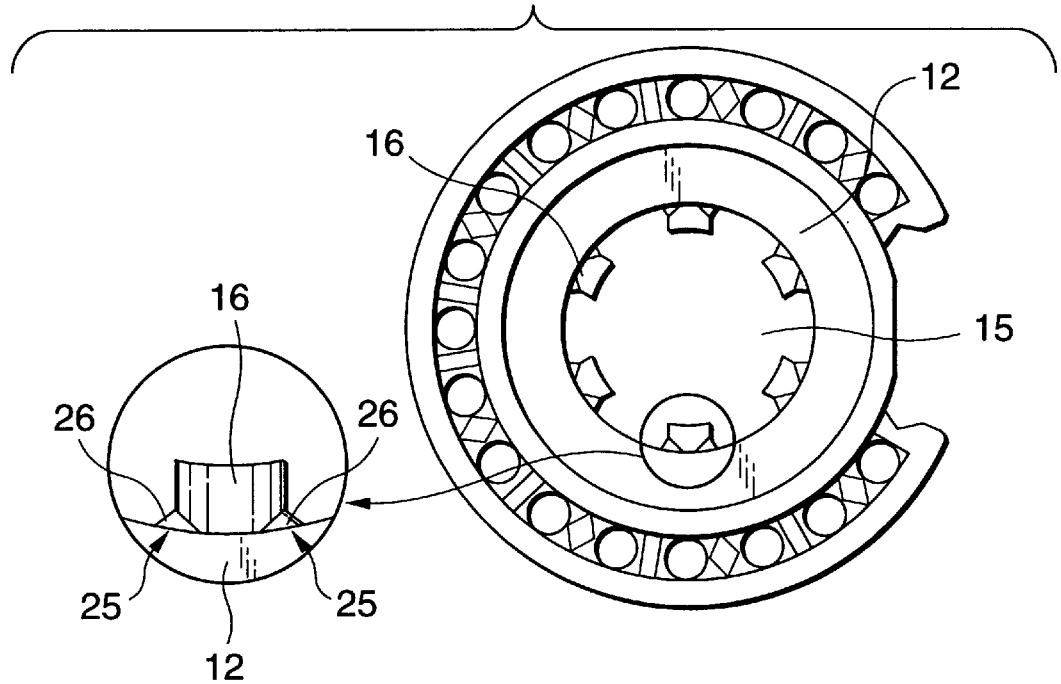
FIG. 5 is a plan view showing a hub for winding a tape contained in a tape cartridge according to the present invention.
Figure 6:
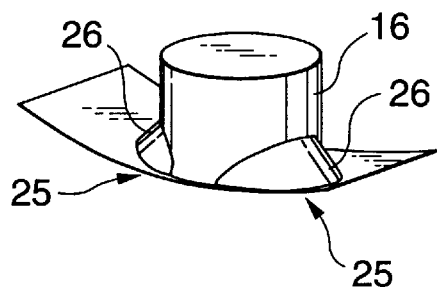
FIG. 6 is an enlarged perspective view of the main part of a hub pawl of the hub.
Figure 7:
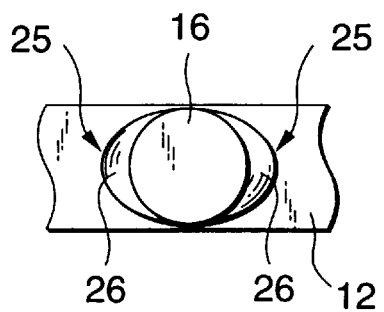
FIG. 7 is a plan view showing a part of the hub pawl.
Figure 8:
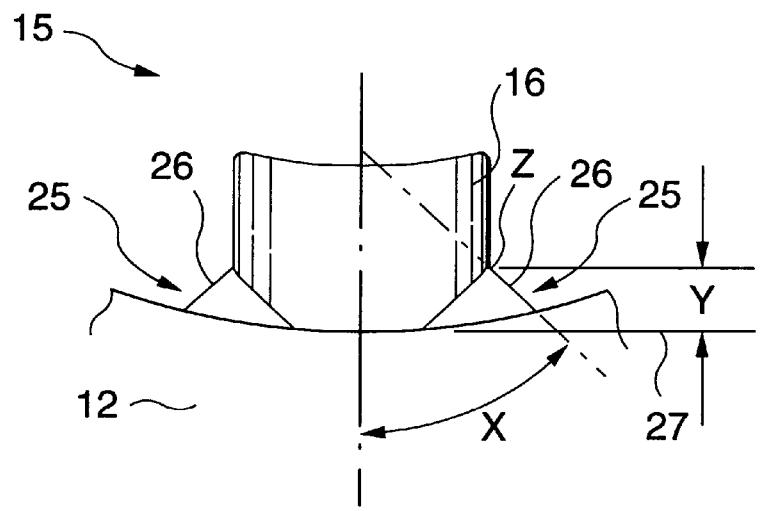
FIG. 8 is a side view showing the dimensional relationship between the hub pawl and the hub.

Next, a tape cartridge according to the present invention will be described with reference to the drawings. Incidentally, a main body case constituting the tape cartridge is similar to the main body case 10 shown in FIG. 1 described in the prior art, and thus the same elements are represented by the same reference numerals.

As shown in FIG. 5 to FIG. 8, the tape cartridge according to the present invention is designed so that ribs 25 are provided to the base portions of plural hub pawls 16 in the hub rotational direction so as to enforce the hub pawls 16.

The rib 25 is designed in a three-dimensional swollen convex shape having a slant surface 26 which is inclined at a slant surface angle X=45 degrees at the base portion of the cylindrical hub pawl 16 and in the rotational direction of the hub 12 and integrally formed with the base portion of the hub pawl 16, that is, in a convex arcuate shape inclined with respect to the cylindrical hub pawl 16.

Although the slant surface 26 is shaped along the rotational direction of the base portion of the hub pawl 16, damage to the hub pawl 16 typically occurs at the end thereof extending into the hub hole 15. Therefore, it is necessary and sufficient to provide the slant surface 26 on opposed sides of the bad portion in the hub rotational direction of the hub pawl 16.

The addition range of the slant surface 26 in this case is preferably set as follows:

Slant surface angle X=30 degrees to 70 degrees. The hub height dimension from the tangential line 27 of the hub hole 15 to the cross point Z between the hub pawl 16 and the slant surface 26 is preferably set as follows:

Hub height dimension Y=0.37 mm to 0.47 mm.

If the slant surface angle X is less than 30 degrees or the hub height dimension Y=0.37 mm or less, the damage preventing effect is extremely lowered. If the slant surface angle X=70 degrees or more or the hub height dimension Y=0.47 mm or more, there is a risk that the rib interferes with the driving shaft at the tape recorder side.

Therefore, the addition range of the rib 25 having the slant surface 26 described above is set to such a range that the damage strength can be ensured and the rib does not come into contact with the driving shaft at the tape recorder side.

Next, a die for forming the rib 25 having the slant surface 26 inclined at 45 degrees for example and provided to the hub pawl 16 in a three-dimensional cylindrical shape will be described with reference to FIGS. 9 and 10.

A die 30 is constructed by providing an arcuate die rib portion 32 to a die hub pawl portion 31 bored in a cylindrical form so as to be linked to the die hub pawl portion 31. The die rib portion 32 is formed by a semi-cylindrical electrode 33A having an U-shaped surface which is brought into contact with the rib portion 32 (see FIG. 9(B)), or by an cylindrical electrode 33B (see FIG. 9(A)).

Figure 9A:
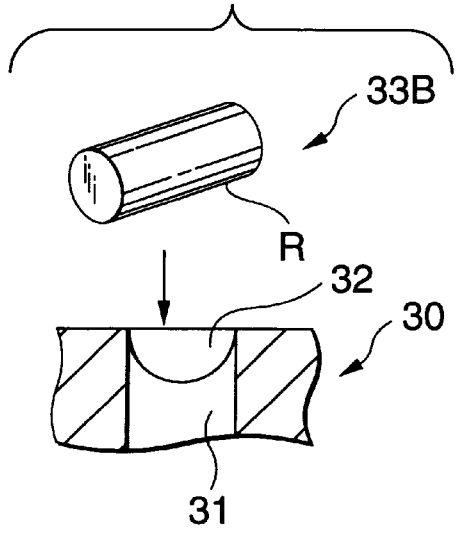
FIG. 9 shows a die and an electrode therefor viewed from the rib rotational direction of the die rib portion provided to the base of the die hub pawl portion, wherein (A) is an explanatory view showing a cylindrical electrode, and (B) is an explanatory view showing a semi-cylindrical electrode.
Figure 9B:
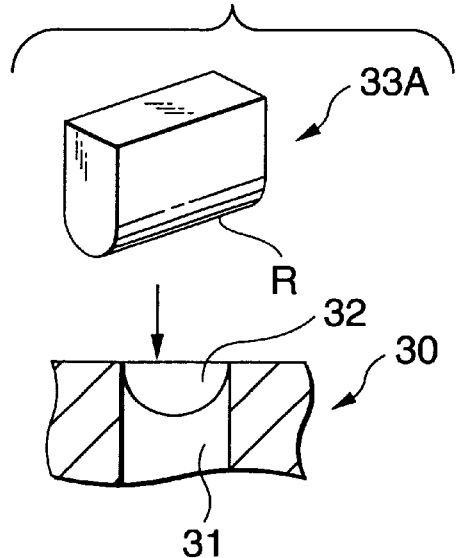

The electrode 33A, 33B shown in FIG. 9(A), (B) may be an electrode having a simple shape in which the contact surface thereof for forming the die rib portion 32 is R-shaped, and it is not limited to the semi-cylindrical or cylindrical electrode 33A, 33B. The processing surface of the electrode may be inclined at 45 degrees for example, and abutted against the die (hub pawl base portion).

Figure 10A:
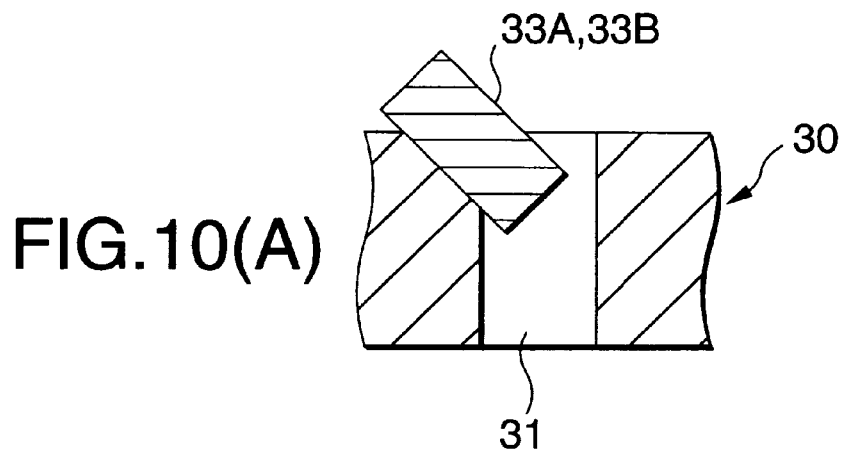
FIG. 10 shows a die and an electrode therefor viewed from a direction perpendicular to the rib rotational direction of the die rib portion provided to the base of the die hub pawl portion, wherein (A) is an explanatory view showing an electrode for forming one die rib portion, (B) is an explanatory view showing an electrode for forming the other die rib portion, and (C) is an explanatory view showing the die rib portion provided to both the ends of the rib rotational direction of the die hub pawl portion.
Figure 10B:
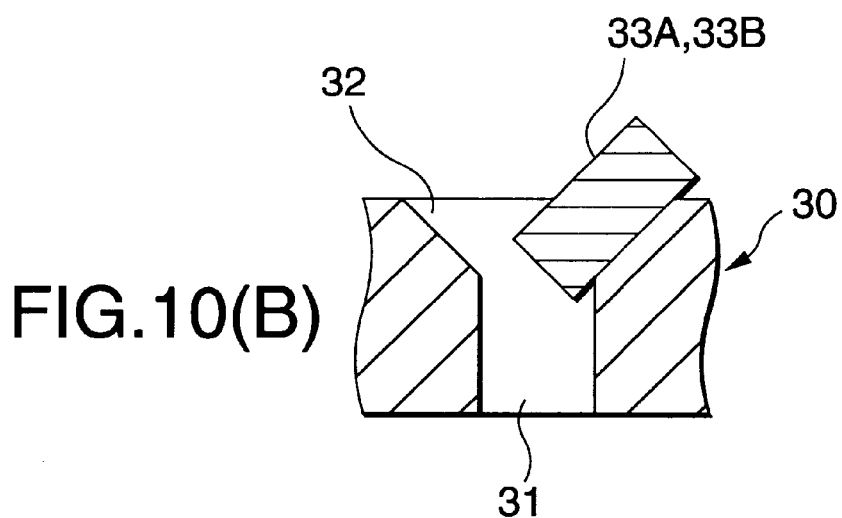
Figure 10C:
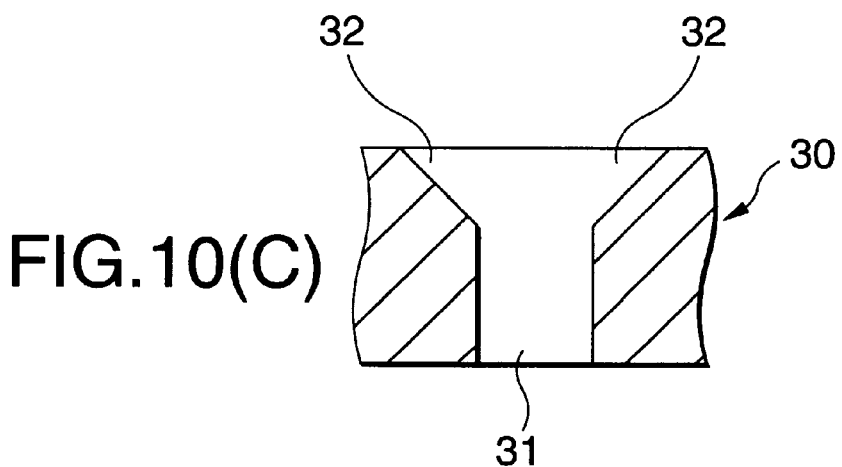

That is, as shown in FIG. 10(A), the electrode 33A, 33B is brought into contact with one side of the die hub pawl portion 31 in the rotational direction of the die hub pawl portion 31 with being inclined at 45 degrees to perform electric discharge machining. Subsequently, as shown in FIG. 10(B), the electrode 33A, 33B is brought into contact with the other side of the die hub pawl portion 31 in the rotational direction thereof with being inclined at 45 degrees to perform electric discharge machining. When the electric discharge machining is performed as described above, as shown in FIG. 10(C), arcuate die rib portions 32, 32 which are inclined to both the sides of the die hub pawl portion 31 in the rotational direction thereof can be formed.

By the above processing method, the rib 25 having the slant surface in the hub pawl 16 is shaped into the arcuate three-dimensional form, whereby power saving in the electrode forming process based on the electric discharge machining can be achieved and the cost can be reduced.

Next, the strength of the rib 25 formed by the die 30 which was actually formed by the electric discharge machining (see FIGS. 9, 10) will be described with reference to the sample data of Table 1.

The following Table 1 shows data of the strength of prototype samples formed by the above processing method. The test articles used in this test were formed by the same resin and the same die. A sample 1 has a rib height dimension of 0.25 mm (0.24 to 0.26 mm), and it is set to a value so that the precision, etc. thereof are varied in accordance with the kind of resin, etc. A sample 2 has a rib height dimension of 0.42 mm (0.37 to 0.47 m), and it is set to a range in which the precision, etc. thereof are not varied in accordance with the kind of the resin, etc.

Figure 11:
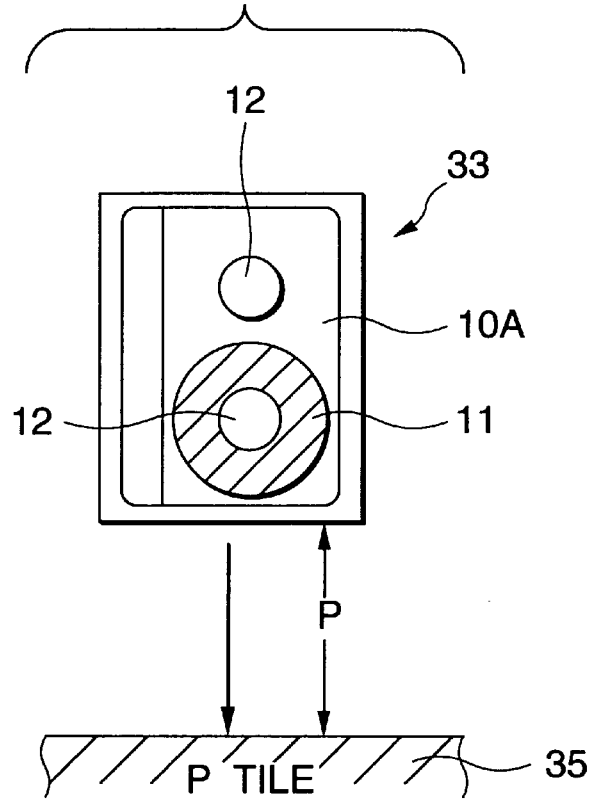
FIG. 11 is an explanatory view showing a test method of hub drop strength by the plastic case.
Figure 12:
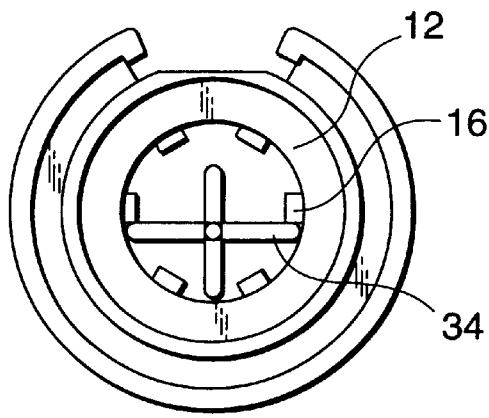
FIG. 12 is a plan view showing a state where a rotation stopper is provided to the hub in the plastic case in the drop method of FIG. 11.

As shown in FIGS. 11 and 12, in a drop test method, a tape cassette 10A in which 90-minute tape 11 is wound is dropped from a position P above a tile 35 (in this embodiment, P=75 cm) under a state that the hub pawls 16 are put on a rotation stopper 34 of a plastic case 33.

Figure 13:
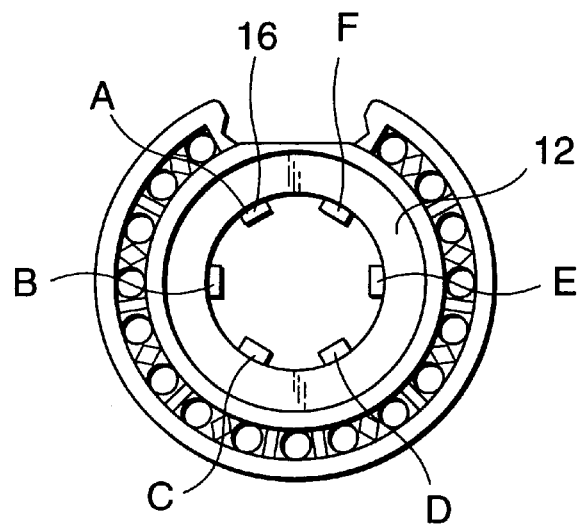
FIG. 13 is a plan view showing points for measuring the rupture strength of the hub pawls.

As shown in FIG. 13, in a pawl rupture strength measuring method, measuring places of the hub pawls 16 of the hub 12 (in this embodiment, points A to F) are pushed by tension gauge of 5 kgf to read the value when rupture occurs.

TABLE 1

| Prototype samples (see FIG. 8) | Drop strength test (75 cm above tile P) | | |
|---|---|---|---|
| X: slant surface angle Y: rib-height dimension | Occurrence number | Occurrence rate | Pawl rupture strength |
| Sample 1 | | | |
| X: 45 degrees Y: 0.25 mm | 4turns/ 20turns | 20% | 3.47 kg |
| Sample 2 | | | |
| X: 45 degrees Y: 0.37 mm | 2turns/ 20turns | 10% | 3.95 kg |

The Table 1 means that as the results of the drop test and the measurement of pawl rupture strength for the hubs 12 of the samples 1 and 2 (having the set dimensions of the present invention) made on an experimental basis, the sample 2 is reduced to be less in drop strength occurrence rate than the sample 1 by 10%, and increased to be more in pawl rupture strength than the sample 1 by about 10%. With these results, by providing the rib 25 of the set dimension of the present invention to the base portion of the hub pawl 16, the damage preventing effect can be surely enhanced.

As described above, in the tape cartridge of the present invention, in order to enhance the damage preventing effect of the hub pawls, the rib having the slant surface is provided to the base portions of the hub pawl in the rotational direction, and the rib is designed in a convex three-dimensional shape which is inclined with respect to the cylindrical hub pawl, whereby the processing becomes possible merely by designing the electrode used when the electric discharge machining of the die is performed into a simple shape such as a cylindrical shape, a semi-cylindrical shape or the like, so that the power saving when forming the electrode for the electric discharge machining can be achieved and also the cost can be reduced.

What is claimed is:

1. A tape cartridge in which a hub for winding a tape therearound is accommodated, said hub having an axis of rotation and comprising a hub hole extending through a center portion thereof and having an inner peripheral surface, a plurality of cylindrical hub pawls projecting from the inner peripheral surface of said hub hole from a base portion thereof, and ribs of a cylindrical shape having slant surfaces which are provided at the base portion of each of said hub pawls in a rotational direction of said hub about its said axis of rotation, and the slant surfaces of said ribs have a three-dimension convex shape which is swollen from the cylindrical hub pawls.

2. The tape cartridge as claimed in claim 1, wherein said ribs having the three-dimensional swollen convex shape are designed in an arcuate shape which is inclined with respect to said cylindrical hub pawls.

3. The tape cartridge as claimed in claim 2, wherein each of said arcuate ribs inclined with respect to said cylindrical hub as a slant angle of 30 to 70 degrees, and the rib height dimension which comprises a point of intersection between an axis of inclination of the slant surface and a longitudinal axis of said hub pawl, and the tangential line of said hub hole is set to 0.37 mm to 0.47 mm.

* * * * *